July 11, 1944. F. R. BRIDGES Re. 22,514

SIGNAL APPARATUS

Original Filed April 19, 1940 3 Sheets-Sheet 1

Inventor
Frank R. Bridges
by his attorney
Melvin R. Jenney

July 11, 1944. F. R. BRIDGES Re. 22,514

SIGNAL APPARATUS

Original Filed April 19, 1940 3 Sheets-Sheet 2

Inventor
Frank R. Bridges
by his attorney
Melvin R. Jenney

SIGNAL APPARATUS

Original Filed April 19, 1940 3 Sheets-Sheet 3

Witness
Frederick S. Grunley

Inventor
Frank R. Bridges
by his attorney
Melvin R. Jenney

Reissued July 11, 1944

Re. 22,514

UNITED STATES PATENT OFFICE 22,514

SIGNAL APPARATUS

Frank R. Bridges, Needham, Mass., assignor to The Gamewell Company, Newton Upper Falls, Mass., a corporation of Massachusetts Original No. 2,270,925, dated January 27, 1942, Serial No. 330,581, April 19, 1940. Application for reissue January 25, 1943, Serial No. 473,517

13 Claims. (Cl. 177—361)

The present invention relates to signal apparatus, and more particularly to fire alarm signal boxes constructed to insure transmission of signals under a wide variety of adverse conditions.

The apparatus described in the Beach Reissue Patent 20,449, reissued July 20, 1937, is a box which will operate to transmit a signal under most adverse conditions that can be expected to arise, such as those due to open lines, ground faults, and substantially any faulty electrical condition except a break in the line on both sides of the box. The present invention has for its object to extend the ability of the box to transmit under adverse conditions, particularly those due to mechanical faults such as approaching exhaustion of the energy of the main spring.

In the box described in the Beach patent, as well as in other types of fire alarm boxes, the spring may be left, through carelessness or otherwise, in only a partially wound condition. If the box is pulled while the line is busy, the non-interfering characteristics may prevent the box from gaining any control over the system until the spring is completely run down. In the box described in the Beach patent means are provided for stopping the train before the spring becomes completely unwound so that sufficient energy may remain in the spring to permit a subsequent operation of the box.

According to the present invention means are provided to insure conversion of the box for signaling over an emergency circuit whenever the spring reaches a predetermined state of approaching exhaustion. This means is preferably mechanical being operated by the spring itself, and occurs at a time when the spring still has sufficient energy to transmit at least one complete cycle through the emergency circuit. If, therefore, the box after being pulled has approached a state of exhaustion due to a busy line, the emergency connection will be automatically thrown into operation even though no electrical fault exists which would operate a box of the type described in the Beach patent.

The invention is further effective to condition the box for emergency signaling in the event of spring breakage, and thus to give a warning signal to direct attention to a condition which might otherwise escape detection.

The invention will be herein specifically illustrated and described as applied to a box of the type described in the Beach patent, but the features of the present invention are applicable to boxes of other types.

Figure 1:
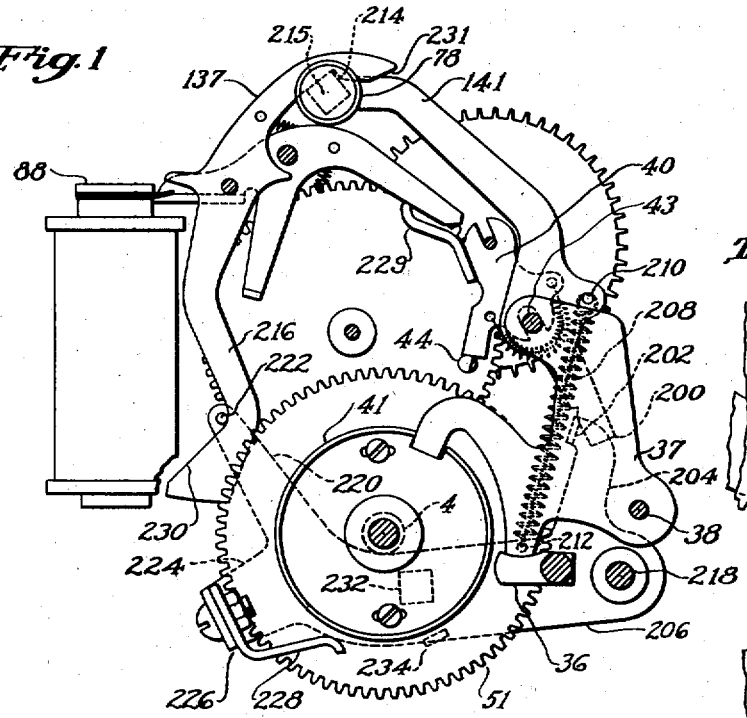
Figure 7:
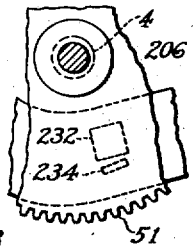
Figure 2:
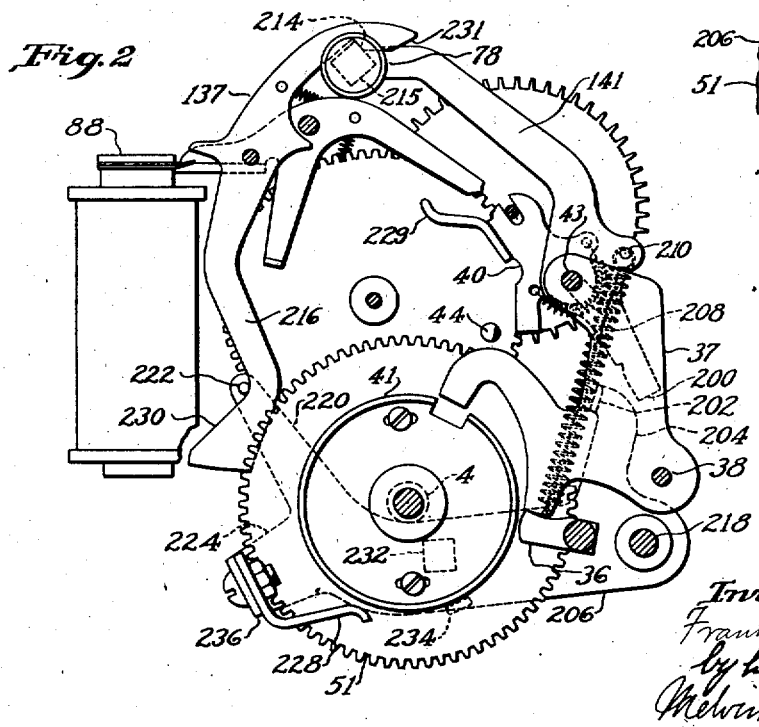
Figure 8:
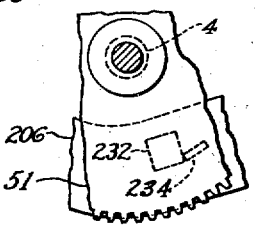
Figure 3:
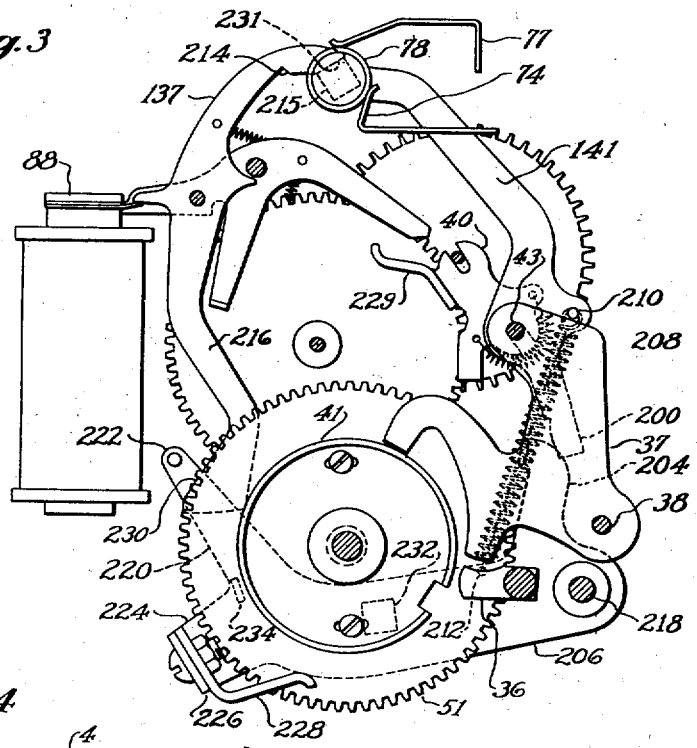
Figure 4:
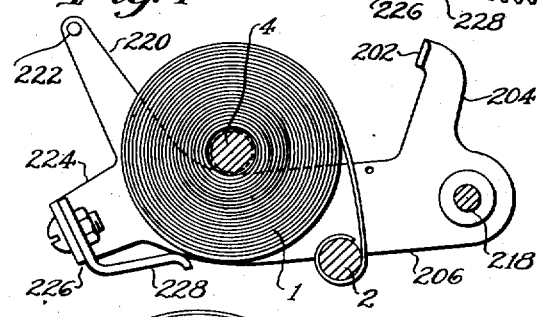
Figure 6:
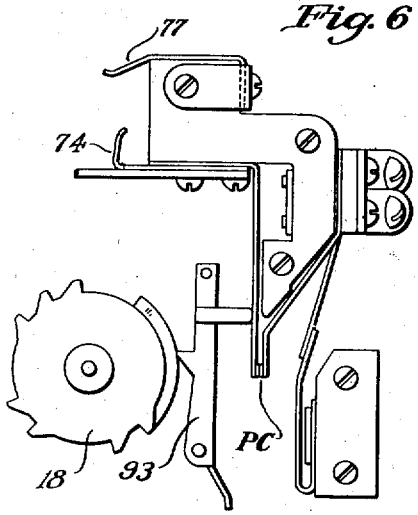
Figure 5:
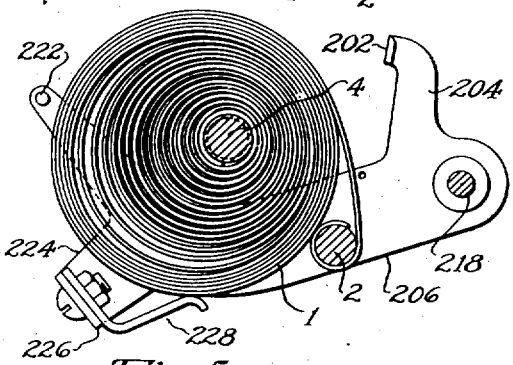
Figure 9:
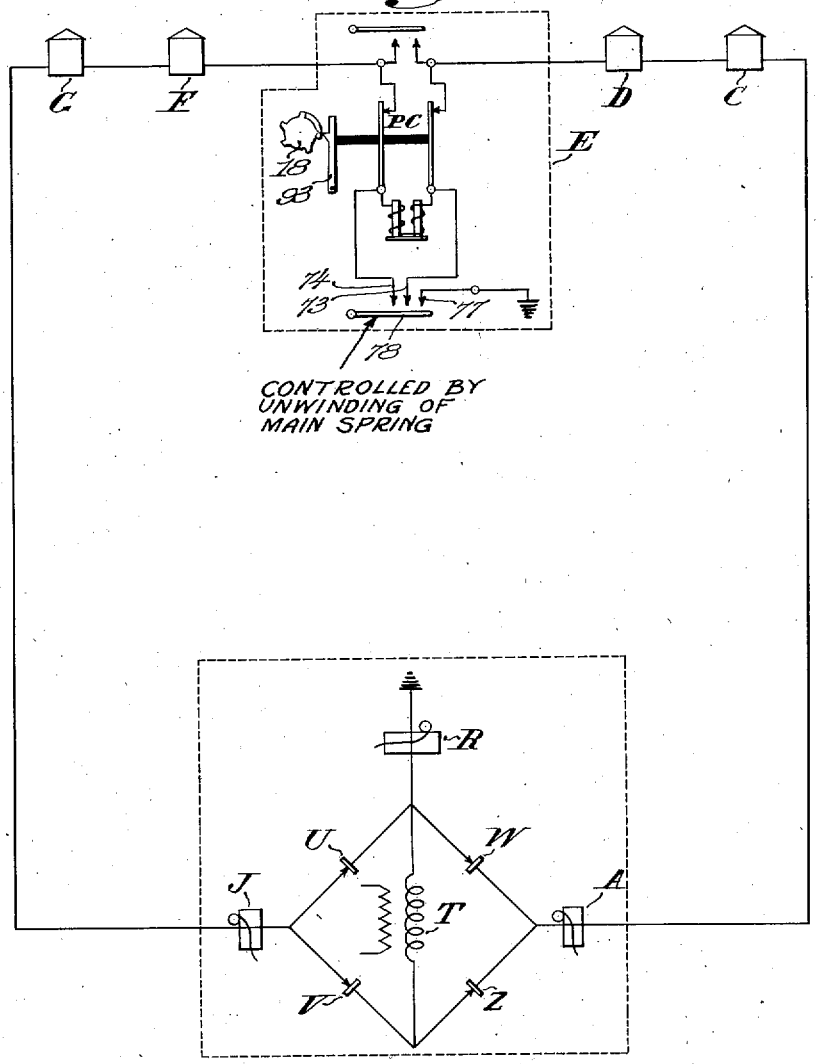

In the accompanying drawings, Fig. 1 is a view of so much of a fire alarm box as is necessary for an understanding of the present invention, the box being shown in its normal inactive condition; Fig. 2 is a view of the box under normal signaling conditions; Fig. 3 is a drawing showing the disposition of the parts under the condition of approaching exhaustion of the energy of the main spring; Figs. 4 and 5 are detail views illustrating the operation of the present invention; Fig. 6 is a detail view of the code wheel and key break lever; Figs. 7 and 8 are detail views to be referred to, and Fig. 9 is a circuit diagram.

In Fig. 1, I have illustrated so much of a box as is necessary to present an understanding of the invention. These figures will be recognized as similar to Figures 10 and 11 of the above-mentioned Beach reissue patent. Certain parts are exactly duplicated and are similarly numbered herein, and a complete description of such parts is unnecessary. I shall, therefore, describe in detail only those parts which are new to the present box or those which have been changed in some particular. Certain parts have also been omitted from the Beach box and these omissions will be mentioned in the course of the description.

Referring to Fig. 1, it will be noted that the tripping projection 36 which is operated by the manual starting lever and the master plate 37 are the same as in the Beach box. The master plate is pivoted on a frame at 38. Pivoted at 43 on the master plate is the switch arm 141, carrying at its end the contactor 78 which is to engage the emergency contacts 73, 74 and 77, particularly shown in Fig. 2 of the Beach patent. The tail of the switch arm 141, however, instead of normally abutting the pivot 38, is shortened as indicated at 200 and its end engages a dog 202 extending upwardly from a projection 204 on a control plate 206, which is to be presently described. The dog 202, when in normal position as indicated in Fig. 1, holds the switch arm 141 in the same position in which it is normally held in Fig. 10 of the Beach patent. For the spring 142, which in the Beach patent is connected between the switch arm 141 and a fixed part of the frame, there is substituted a spring 208 which is connected at one end to a pin 210 on the switch arm 141 adjacent to the pivot 43, and at the other end to the control plate 206, as indicated at 212. The spring, therefore, normally tends to maintain the switch arm 141 and the control plate 206 in the positions indicated in Fig. 1.

The latch arm 137 which normally holds the switch arm 141 in the position of Fig. 1, is similar to that described in the Beach patent, except that its upper end is preferably formed with a well-defined notch 214 to engage a square stud 215 on which the contact member 78 is supported. Also, the latching arm is provided with an integral downwardly extending tail 216 to be hereinafter described.

The control plate 206 is pivoted on a stud 218 mounted on the frame of the box adjacent to the stud 38 which is the pivot for the master plate 37. The control plate underlies the starting projection 36 and also the counting gear wheel 51 to which the rounds counting disk 41 is attached. The control plate normally bears against and is positioned by the main spring shaft 4. The plate has a projection 220 provided with a pin 222 normally engaged by the tail 216 of the arm 137. A portion 224 of the plate extends outwardly beyond the periphery of the gear 51 and is provided with an upstanding projection 226 to which is secured an inwardly extending contact member or follower 228 adjacent to the main spring 1 and adapted to be engaged thereby when the latter unwinds to a predetermined extent (Figs. 4 and 5).

The present box also differs from the Beach box in the following particulars: The armature is held down, when the box is inactive, by a tail 229 on the stop dog 40, instead of being in retracted position. The part 122 which is most clearly shown in Figs. 12 and 13 of the Beach patent is here omitted because the positive latching action at 214, 215 renders it unnecessary. Furthermore, much of the rounds counting mechanism shown in Figs. 17 to 19 of the Beach patent is omitted, as will presently appear.

The positions of the control plate under normal and emergency conditions are shown in Figs. 4 and 5, respectively. Normally the follower 228 is out of engagement with the spring and is not engaged thereby during a normal signaling operation. If all of the conditions are such that the spring unwinds unduly the outer convolution of the spring engages the member 228 and swings the plate 206 about the pivot 218. This condition is shown in Fig. 5. The end of the main spring is attached to the post 2 so that the spring in unwinding assumes the unsymmetrical shape indicated in Fig. 5, whereby upon engagement of the spring with the member 228 an outward force is applied to the latter which causes the plate to swing in a counterclockwise direction. When the plate swings into the position of Fig. 5, the pin 222 on the end of the projecting arm 220 slides along a cam surface 230 on the tail 216 of the arm 137. This action lifts the upper end of the arm 137 to unlatch the switch arm 141, permitting the latter to swing under the tension of the spring 208 and carry the contact roller 78 into engagement with the emergency signal contacts 73, 74 and 77. The emergency position of the parts is shown in Fig. 3. It will be noted that as soon as the arm 141 is unlatched, the square stud 215 rides under the upper and face of the arm 137 and continues to move the latter outwardly, so that when the condition of Fig. 3 is reached the cam surface 230 on the tail of the latch arm has moved away from the pin 222. A flat surface 231 at the extreme end of the latch arm 137 is supported on one of the faces of the square stud 215 when the condition of Fig. 3 is reached.

The rounds measuring gear 51 and disk 41 are as in the Beach patent and controlled by a clutching arrangement illustrated in Fig. 14 of said patent, except that no ratchet teeth are provided on the wheel 47 and all parts numbered from 152 to 167 (shown particularly in Figs. 17 to 20 of the Beach patent) are omitted. These parts are used in the Beach box to stop the train after it has operated ineffectively for a predetermined number of rounds. In the present invention this train-stopping mechanism is not used since the emergency connection is insured before the spring reaches complete exhaustion. Means are provided, however, to prevent attempted tripping of the box after the spring has reached substantial exhaustion. This is accomplished by a stop block 232 carried on the upper side of the plate 206 and adapted to be moved into the path of a depending lug 234 on the gear 51 when the plate has been moved to its outermost position. After the lug engages the block, attempted pulling of the box by operation of the manual handle will not allow the rounds counting disk to start and no signal can be transmitted until the spring is rewound. This stopping action, it will be understood, occurs only after the emergency conditioning devices have been set in operation through a previous approach toward substantial unwinding.

The various conditions of operation will now be described.

For normal signaling the box operates exactly as described in the Beach patent. Upon manual tripping of the box the master plate 37 is rotated clockwise by the projection 36. The pivot 43 is thus swung outwardly into the position shown in Fig. 2 and the tail of the stop dog 40 moves off the pin 44 to permit the train to start. The upper end of the arm 141 is held latched by the arm 137 so that the tail 200 of the arm 141 moves out of engagement with the lug 202 on the projecting part of the switch plate 206. This is equivalent to the condition illustrated in Fig. 13 of the Beach patent in which the tail of the switch arm 141 has moved outwardly from engagement with the pivot 138. Assuming the line to be in proper condition and not otherwise busy, the code wheel turns through a complete cycle, usually four rounds, during which time the key break lever or sender arm 93 (Fig. 6) is operated by the code wheel 18 to send the particular distinctive signal determined by the code projections on the wheel. During this normal signaling operation the armature 88 of the magnet is held attracted throughout the whole cycle. At the end of the cycle the train is stopped by engagement of the pin 44 with the tail of the stop dog 40.

For emergency signaling dictated by an electrical fault the box also operates as described in the Beach patent. For example, in the case of a broken line or a short circuit across the box, the code wheel makes one test round during which the armature 88 is in retracted position. Thereafter the arm 141 is automatically unlatched and it swings about its pivot 43 to engage the emergency contacts after which a complete cycle (four rounds) is connected for emergency circuit transmission. To measure off the required number of rounds the disk 42 is controlled by the clutching mechanism shown in Fig. 14 of the Beach patent. At the conclusion of the four signaling rounds the box is restored to normal inactive condition.

The follower 228 is so adjusted that under the conditions described above, if the main spring has been fully wound, the follower is not engaged by the main spring.

If the box when tripped finds the line busy, the code wheel will continue to run ineffectively until the interference no longer exists, following which the box will transmit its own signal. This condition most frequently arises when the box is tripped during transmission of a signal by another box. In such a case the armature 88 instead of being held in retracted position during one full test round, will be attracted and retracted at least once during each round because of the opening and closing of the line through the action of the other box. Under such conditions the sender arm 93 cannot be released and the box is ineffective to interfere with the previously operated box. Since the main spring when fully wound has a capacity for a large number of rounds, usually twenty-four, it will not, under ordinary circumstances, approach exhaustion during signal transmission by the other box. Therefore, when the line is cleared the box will be free to transmit its signal as above described.

There are, however, some instances in which the spring may approach exhaustion before having an opportunity to transmit its signal. For example, through carelessness the spring might not have been sufficiently wound. Again, it is possible that a number of other boxes may have been pulled and the conditions may be such that the box under discussion cannot gain control of the line. Another possible circumstance is that a fluctuating short circuit may exist across the box so that the magnet instead of being maintained fully retracted during a test round, may be repeatedly attracted and retracted, thus giving the effect of a busy line, but without any possibility for the box to assume control. In any such instance the spring continues to unwind. As the spring approaches exhaustion, but while it still retains capacity for operation through several rounds, the spring engages the follower 228 and swings the control plate 206 counterclockwise, thereby operating the latching arm 137 to unlatch the switch arm 141 and convert the connections to the emergency signaling circuit. Thereafter the box measures off four rounds during which the box is capable of transmitting through the emergency circuit.

The operation of the box now depends on whether or not an emergency circuit connection is permanently established at the central office. The emergency circuit is usually a ground circuit and the central office may have a permanent ground connection as indicated, for example, in Fig. 9, corresponding to Fig. 22 of the Beach patent, or it may have a manual switching arrangement to permit a ground connection only when desired, as indicated in Fig. 21 of the Beach patent. For use with boxes of the present invention the permanent ground connection at the central office is preferred and the operation of the box will first be described in connection with such a system.

In Fig. 9, the central station has a transformer T, the primary of which is connected to any suitable alternating current source, while the secondary is connected across the input diagonal of a rectifier bridge comprising four rectifiers U, V, W and Z. The upper end of the transformer winding is connected to ground through a recorder R. The outgoing lines are connected to opposite corners of the rectifier bridge through recorders A and J or other manifesting devices. The lines include boxes indicated at C, D, E, F and G, the internal connections of box E being shown diagrammatically.

Under normal conditions, the line carries full wave rectified current. Under emergency conditions, contact 78 is closed on contacts 73, 74 and 77.

If the failure of the box to gain control of the line has been due to the fact that the line has been busy with another box, then upon establishment of the emergency connection as above described, such other box, if of the non-interfering type, will be cut out, and the box which has been converted for emergency signaling will transmit over the ground and line circuits. If the conversion to the emergency connection has been brought about by approaching exhaustion of the spring during transmission of a signal, the box will transmit the remainder of the signal over both the ground and line circuits. In any such case the measuring disk counts off one complete cycle (four rounds).

The contact member 228 is preferably so adjusted that at the completion of the four-round signaling cycle described above, the lug 232 will come almost but not quite into line with the stop block 234 on the control plate 206. This condition is illustrated in Fig. 7, and occurs at a time when sufficient energy still remains in the main spring to transmit another complete cycle upon a subsequent tripping of the box. When the parts 232, 234 are in the relative positions indicated in Fig. 7 the box is left in the condition with the emergency connection established by engagement of contact 78 with contacts 73, 74 and 77, as shown in Fig. 3. If the box should then be subsequently tripped, the ground connection, having been already established at the box, permits immediate transmission over the ground circuit for a full cycle of four rounds. During this last-named cycle the spring continues to unwind and thereby to move the plate 206 further outwardly so that at the end of the cycle the block 232 comes into the path of the lug 234, as indicated in Fig. 8. At this time the main spring has reached substantial exhaustion. The box cannot thereafter be again tripped until the spring is rewound because the engagement of the parts 232, 234 prevents the train from starting. The stoppage of the parts at a definite place, as indicated in Fig. 8, insures that the contacts PC are closed so that the line is left in proper condition for transmission of signals by other boxes on the line.

The present invention also affords protection by giving a suitable warning following breakage of the spring. Spring breakage is not frequent but when it does occur is serious, because in the ordinary form of box, it cannot readily be detected. In the box of the present invention if the spring breaks at any point the convolutions expand and thus cause the plate 206 to be swung counterclockwise, thereby unlatching the switch arm 141 which operates to close contact 78 on the grounding contacts 73, 74 and 77. When a permanent ground is used at the central station, the establishment of the ground circuit at the box through the engagement of these contacts gives a stroke on the emergency circuit signaling equipment. A warning is thus given that a ground exists at some point on the line, and by usual methods of fault location it may be traced to the box, whereupon the spring may be replaced. The box is therefore put out of service only during the time necessary for discovery and repair of the fault.

The foregoing description of operation has assumed the use of a permanent ground at the central office which, as previously stated, is the preferred system for use with boxes of the type herein described. If a permanent ground is not used at the central office the box itself operates in exactly the same manner, even though it is ineffective to transmit emergency signals until the ground circuit has been manually completed at the central office. For example, in the case of insufficient winding of the spring the emergency box connection will be established when the spring has unwound far enough to cause unlatching of the arm 141. The box will then simply continue to transmit over the line in the normal manner if the line is in proper condition. At the end of the cycle, however, the box will not restore to its normal inactive condition but will be left with the contact 78 in engagement with the emergency contacts. The usual routine test which is ordinarily made several times a day will indicate a ground on the line. A ground connection may then be manually established at the central office until such time as the fault can be located and corrected. After the establishment of the ground at the central office the box, if later tripped, will still have sufficient main-spring energy to insure transmission of a complete cycle through the ground circuit.

In the event of spring breakage in a system which does not have a permanent central office ground, no warning will be given at the time of breakage, but the ground established at the box will be detected at the time of the routine test. Consequently, the box will be out of service only during the interval between tests in addition to such time as may be necessary for location and repair of the fault.

It will be observed that the present invention, while preserving all of the safety features of the apparatus described in the Beach patent, also provides additional protection against other adverse conditions, particularly those which arise from breakage or approaching exhaustion of the main spring. While the invention has been illustrated and described as embodied in a fire alarm box, it will be understood that it may be employed for other signal apparatus using a normally wound spring, so long as a member actuated by the spring acts upon a circuit controller while the spring is still conditioned to drive the apparatus through at least one complete operating cycle.

Having thus described the invention, I claim:

1. In a signaling device having code signaling contacts and a normally wound operating spring for driving the device through a plurality of operating cycles, a circuit controller having emergency switch contacts for connection of the code signaling contacts with an emergency signaling circuit, and means actuated by engagement with the spring during unwinding thereof for abnormally conditioning said circuit controller to operate said emergency switch contacts to cause code signaling through said emergency switch contacts while said spring is still conditioned to drive said device through at least one complete operating cycle.

2. In a signaling device having code signaling contacts and a normally wound operating spring for driving the device through a plurality of operating cycles, a circuit controller having emergency switch contacts for connection of the code signaling contacts with an emergency signaling circuit, means actuated by engagement with the spring during unwinding thereof for abnormally conditioning said circuit controller to operate said emergency switch contacts to cause code signaling through said emergency switch contacts, and means for stopping the device while the spring is still conditioned to drive said device through at least one operating cycle following termination of the cycle during which the circuit controller is abnormally conditioned.

3. In a signaling device having code signaling contacts and a normally wound operating spring for driving the device through a plurality of operating cycles, a circuit controller having emergency switch contacts for connection of the code signaling contacts with an emergency signaling circuit, means actuated by engagement with the spring during unwinding thereof for abnormally conditioning said circuit controller to operate said emergency switch contacts to cause code signaling through said emergency switch contacts while said spring is still conditioned to drive said device through at least one complete operating cycle, and means for maintaining the circuit controller in abnormal condition until the spring is rewound.

4. In a signaling device having code signaling contacts and a normally wound operating spring for driving the device through a plurality of operating cycles, a circuit controller having emergency switch contacts for connection of the code signaling contacts with an emergency signaling circuit, means actuated by engagement with the spring during unwinding thereof for abnormally conditioning said circuit controller to operate said emergency switch contacts to cause code signaling through said emergency switch contacts, means for stopping the device while the spring is still conditioned to drive said device through at least one operating cycle following termination of the cycle during which the circuit controller is abnormally conditioned, and means for maintaining the circuit controller in abnormal condition until the spring is rewound.

5. In a code signaling device having mechanism including a normally wound driving spring for transmitting a code signal a plurality of rounds, stopping means operable for arresting operation of said mechanism only after completing an operating cycle comprising transmission of a certain predetermined number of rounds of the code signal, starting means for said mechanism, a circuit controller, and controlling means rendered effective by unwinding of said spring for abnormally conditioning said circuit controller while said spring is still effective to drive said mechanism for at least one additional cycle following the next operation of said stopping means, said controlling means including means for rendering said starting means ineffective after operation of said mechanism for said additional cycle and before the energy of the spring has become completely exhausted.

6. In a code signal transmitting mechanism having a normally wound spring for driving said mechanism through a plurality of cycles of operation, normally closed signaling contacts operable by said mechanism, normally open contacts for at times establishing a connection for signaling over an emergency circuit, and means rendered effective by unwinding of said spring for closing said normally open contacts to cause code signaling therethrough while said spring is still effective to drive said mechanism for at least one additional cycle.

7. In a code signal transmitting mechanism having a normally wound spring for driving said mechanism through a plurality of predetermined cycles of operation, stopping means controlled by said mechanism for arresting operation thereof only after completion of one of said cycles, starting means for said mechanism, normally closed signaling contacts operable by said mechanism, normally open contacts for at times establishing a connection for signaling over an emergency circuit, and controlling means rendered effective by unwinding of said spring for closing said normally open contacts while said spring is still effective to drive said mechanism for at least one additional cycle following the next operation of said stopping means, said controlling means including means for rendering said starting means ineffective after operation of said mechanism for said additional cycle and before the energy of the spring has become completely exhausted.

8. In a code signaling device having mechanism including a normally wound driving spring for transmitting a code signal a plurality of rounds, stopping means operable for arresting operation of said mechanism only after completing an operating cycle comprising transmission of a certain predetermined number of rounds of the code signal, starting means for said mechanism, a circuit controller, controlling means rendered effective by unwinding of said spring for abnormally conditioning said circuit controller while said spring is still effective to drive said mechanism for at least one additional cycle following the next operation of said stopping means, said controlling means including means for rendering said starting means ineffective after operation of said mechanism for said additional cycle and before the energy of the spring has become completely exhausted, and means for maintaining the circuit controller in abnormal condition until the spring is rewound.

9. In a code signal transmitting mechanism having a normally wound spring for driving said mechanism through a plurality of cycles of operation, normally closed signaling contacts operable by said mechanism, normally open contacts controlled by said mechanism for at times establishing a connection for signaling over an emergency circuit, and means rendered effective by unwinding of said spring for closing said normally open contacts to cause code signaling therethrough while said spring is still effective to drive said mechanism for at least one additional cycle and for maintaining said contacts closed until the spring is rewound.

10. In a code signal transmitting mechanism having a normally wound spring for driving said mechanism through a plurality of predetermined cycles of operation, stopping means controlled by said mechanism for arresting operation thereof only after completion of one of said cycles, starting means for said mechanism, normally closed signaling contacts operable by said mechanism, normally open contacts for at times establishing a connection for signaling over an emergency circuit, controlling means rendered effective by unwinding of said spring for closing said normally open contacts while said spring is still effective to drive said mechanism for at least one additional cycle following the next operation of said stopping means, said controlling means including means for rendering said starting means ineffective after operation of said mechanism for said additional cycle and before the energy of the spring has become completely exhausted, and means for maintaining said normally open contacts closed until the spring is rewound.

11. In a code signal transmitting mechanism having a normally wound spring for driving said mechanism through a plurality of cycles of operation, normally closed signaling contacts operable by said mechanism, normally open contacts for at times establishing a connection for signaling over an emergency circuit, a circuit controller for said normally open contacts, a latch to hold the circuit controller normally ineffective, and a control member operated by engagement with the spring during unwinding thereof to release the latch.

12. In a code signal transmitting mechanism having a normally wound spring for driving said mechanism through a plurality of cycles of operation, normally closed signaling contacts operable by said mechanism, normally open contacts for at times establishing a connection for signaling over an emergency circuit, a circuit controller for said normally open contacts, a latch to hold the circuit controller normally ineffective, a pivoted control plate having a follower to be engaged by the spring when the spring reaches a predetermined state of unwinding, and means carried by the plate to release the latch.

13. In a code signal transmitting mechanism having a normally wound spring for driving said mechanism through a plurality of cycles of operation, normally closed signaling contacts operable by said mechanism, starting means for said mechanism, a control member operated by engagement with the spring during unwinding thereof and having a stop member to prevent operation of the starting means, said stop member being effective only at the end of a complete cycle after the control member has been moved a predetermined amount by the spring and before the energy of the spring has become completely exhausted.

FRANK R. BRIDGES.